No. 704,869. Patented July 15, 1902.
J. FISCHER & H. SCHNEIDER.
COUPLING FOR WIRES, CONDUCTORS, OR THE LIKE.
(Application filed Jan. 22, 1902.)

(No Model.)

Witnesses
F. H. Schott
Anton Gloekner

Inventors
Jacob Fischer and
Hermann Schneider
By Max Georgii
his Attorney

THE NORRIS PETERS CO., PHOTO-LITHO., WASHINGTON, D. C.

UNITED STATES PATENT OFFICE.

JACOB FISCHER AND HERMANN SCHNEIDER, OF SOLOTHURN, SWITZERLAND.

COUPLING FOR WIRES, CONDUCTORS, OR THE LIKE.

SPECIFICATION forming part of Letters Patent No. 704,869, dated July 15, 1902.

Application filed January 22, 1902. Serial No. 90,741. (No model.)

*To all whom it may concern:*

Be it known that we, JACOB FISCHER, a citizen of Switzerland, and HERMANN SCHNEIDER, a citizen of Germany, both residing at Solothurn, Republic of Switzerland, have invented certain new and useful Improvements in Couplings for Wires, Conductors, or the Like; and we do hereby declare the following to be a full, clear, and exact description of the invention, such as will enable others skilled in the art to which it appertains to make and use the same.

This invention has for its object to provide a means for coupling wires or conductors together; and it consists of a flexible sleeve of helically-wound wire, which forms when in a free state the wall of a spirally-shaped socket of suitable length, so that when the ends of the sleeve-coil are turned back the ends of the two wires or conductors which are to be coupled together can be inserted side by side into the interior of this sleeve-coil, which is now practically straight, and the ends of the spiral then released. The overlapping ends of the wires or conductors are thus gripped tightly together and held by the torsion in the spiral coil.

In the accompanying drawings a form of construction of the object of this invention is shown as an example.

Figure 1:
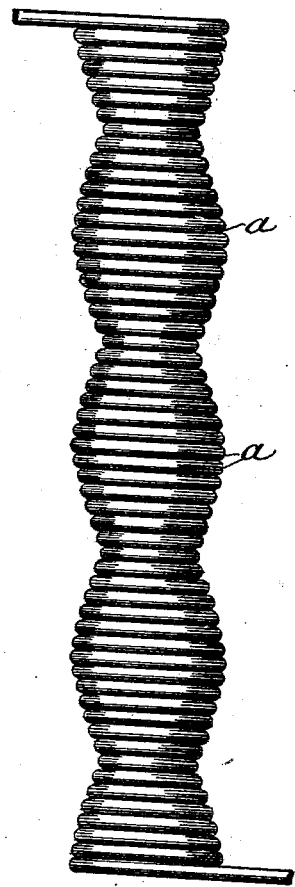
Figure 3:
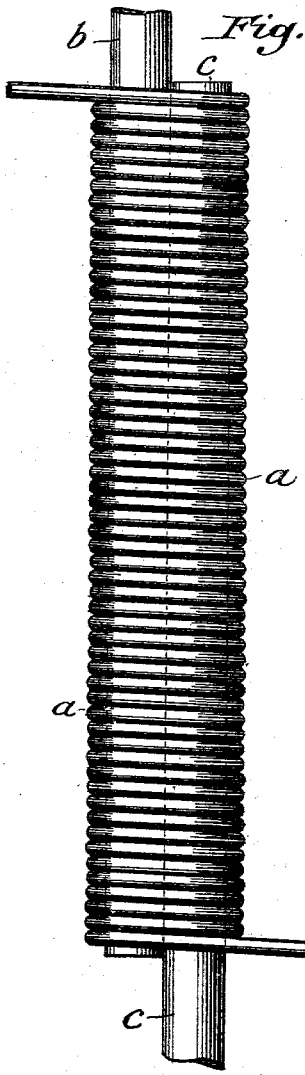
Figure 2:
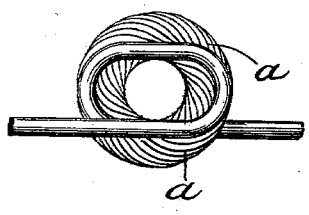
Figure 4:
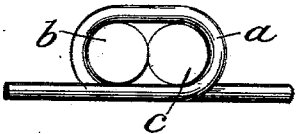

Figure 1 is a side elevation, and Fig. 2 an end elevation, of the flexible sleeve in a free state. Figs. 3 and 4 are side and end elevations, respectively, of a wire-joint made with the aid of the sleeve according to this invention.

From Figs. 1 and 2 is clearly seen how the continuous wire coils of the sleeve *a* form the walls of a helically-shaped channel of longish section, whereas in Figs. 3 and 4 the sleeve is shown with its ends turned back in such a manner that the bore of this sleeve is approximately straight and with the wire ends *b* and *c* inserted to overlap in the same. In consequence of the tendency of the sleeve *a* to reassume the shape it possesses as in Figs. 1 and 2 each of the wire coils exerts a strong side pressure on the wire ends *b* and *c*, so that they are held fast by friction in the sleeve *a*. Both the ends *b* and *c* may be submitted to great pulling strains without either of them slipping in the coil-sleeve *a*.

Having now particularly described and ascertained the nature of our said invention and in what manner the same is to be performed, we declare that what we claim is—

A wire or conductor coupler consisting of a flexible sleeve of helically-wound wire the coils of which when in a free state form the walls of a spirally-shaped socket so that when the ends of this sleeve-coil are turned back the ends of the wires or conductors may be inserted into the interior of this sleeve-coil, the interior of which now forms an approximately straight bore, and by releasing the ends of the coil the ends of the wires or conductors are gripped and held fast in consequence of the torsion in the sleeve-coil.

In testimony whereof we affix our signatures in presence of two witnesses.

JACOB FISCHER.
HERMANN SCHNEIDER.

Witnesses:
EDUARD VON WALDKIRCH,
ERNEST MARZ.